US010867502B1

(12) United States Patent
Makley et al.

(10) Patent No.: US 10,867,502 B1
(45) Date of Patent: Dec. 15, 2020

(54) METHOD AND APPARATUS FOR REUNITING GROUP MEMBERS IN A RETAIL STORE

(71) Applicant: Toshiba Global Commerce Solutions Holdings Corporation, Tokyo (JP)

(72) Inventors: Hye Suk Makley, Morrisville, NC (US); David John Steiner, Raleigh, NC (US); Daniel Hunt, Wake Forest, NC (US); Nancy Yaguda, Apex, NC (US); William Larry Vaught, Creedmoor, NC (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 0 days.

(21) Appl. No.: 16/568,613

(22) Filed: Sep. 12, 2019

(51) Int. Cl.
*G08B 21/02* (2006.01)
*G06K 9/00* (2006.01)
*G06F 3/0482* (2013.01)
*H04W 4/21* (2018.01)
*H04W 4/029* (2018.01)
*H04W 4/024* (2018.01)

(52) U.S. Cl.
CPC ....... *G08B 21/0266* (2013.01); *G06F 3/0482* (2013.01); *G06K 9/00255* (2013.01); *G06K 9/00288* (2013.01); *H04W 4/024* (2018.02); *H04W 4/029* (2018.02); *H04W 4/21* (2018.02)

(58) Field of Classification Search
CPC combination set(s) only.
See application file for complete search history.

(56) References Cited

U.S. PATENT DOCUMENTS

| 7,688,349 B2 | 3/2010 | Flickner et al. |
| 7,961,174 B1 | 6/2011 | Markovic et al. |
| 9,865,148 B2* | 1/2018 | Boyd ............... G08B 21/24 |
| 10,192,419 B2* | 1/2019 | Boyd ............... G08B 21/22 |
| 2007/0036395 A1* | 2/2007 | Okun ............... G07C 9/28 382/115 |
| 2007/0189585 A1* | 8/2007 | Sukegawa ........ G06K 9/00885 382/118 |
| 2015/0227609 A1* | 8/2015 | Shoemaker ....... G06F 16/532 707/737 |

* cited by examiner

*Primary Examiner* — Travis R Hunnings
(74) *Attorney, Agent, or Firm* — Coats + Bennett, PLLC

(57) ABSTRACT

A control server associated with a retail store places or assigns people that are determined to be socially interrelated into corresponding groups. When a group member becomes separated from the group, an image of that person is analyzed and used to identify his/her group. Once identified, the control server generates a notification indicating the current locations in the retail store of both the group and the person who became separated, and indicates a route the person can take through the store to reunite with the group.

20 Claims, 6 Drawing Sheets

PROCESSING CIRCUITRY
70

IMAGE OBTAINING MODULE/UNIT
82

IMAGE ANALYSIS MODULE/UNIT
84

GROUP ASSOCIATING MODULE/UNIT
86

GROUP TRACKING MODULE/UNIT
88

GROUP IDENTIFICATION MODULE/UNIT
90

LOCATION DETERMINING MODULE/UNIT
92

NOTIFICATION GENERATION MODULE/UNIT
94

COMMUNICATIONS INTERFACE MODULE/UNIT
96

FIG. 5

METHOD AND APPARATUS FOR REUNITING GROUP MEMBERS IN A RETAIL STORE

TECHNICAL FIELD

The present disclosure relates generally to computing systems for retail stores, and more particularly to computers configured to identify and track groups of socially interrelated people as they move through the retail store.

BACKGROUND

Families and friends tend to shop together in groups. Often times, one of the people in the group, such as a child, for example, will separate from the group to look at something in which they are interested. Unfortunately, however, such separations occur very quickly and are not always noticed by the others in the group. Upon realizing that one of their members is gone, the group (e.g., a mother or father) usually stops what they are doing to find the separated member. However, the task of finding someone can be very difficult, especially in large stores. Further, the separation can be extremely stressful for both the person that is separated from the group (e.g., the child) and the other group members (e.g., the father and/or mother).

BRIEF DESCRIPTION OF THE DRAWINGS

FIG. 5 is a functional block diagram illustrating a computer program product configured to control a computer to reunite the members of a group of socially interrelated people according to the present disclosure.

DETAILED DESCRIPTION

Embodiments of the present disclosure provide a computer, a method, and a corresponding non-transitory, computer-readable storage medium for reuniting the members of a group of "socially interrelated" people after one or more of those members have become separated from the rest of the group. In the context of this disclosure, the term "socially interrelated" means that the people in the group (i.e., the group members) are connected by some common social construct or link. For example, the people in a group may be family members, friends, acquaintances, or some combination thereof. Further, the present disclosure does not require that each member of the group have a direct social link to each of the other members of the group. Rather, all that is needed is that any given member of the group have a social connection to at least one other member of the group.

In one embodiment, and as described herein, the present disclosure is implemented in the context of a retail store. However, those of ordinary skill in the art should understand that this is illustrative only. Embodiments of the present disclosure may be implemented in any setting where the members of a group of socially interrelated people can be separated from each other and subsequently reunited.

Figure 1:
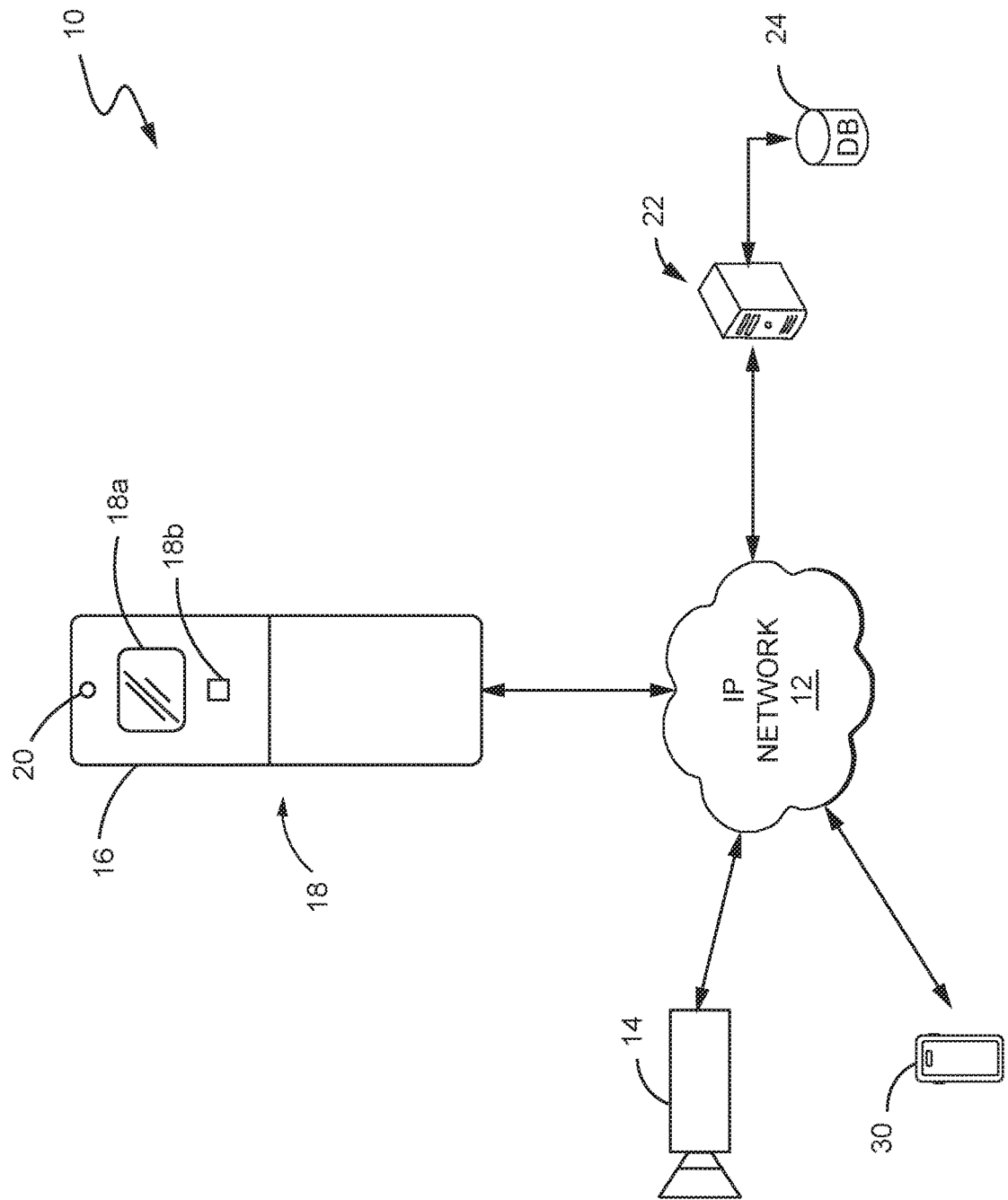
FIG. 1 is a functional block diagram illustrating a system configured according to the present disclosure.

Turning now to the drawings, FIG. 1 is a functional block diagram illustrating a system 10 configured according to one embodiment of the present disclosure. As seen in FIG. 1, system 10 comprises a communications network (i.e., IP network) 12 communicatively interconnecting a plurality of security cameras 14 positioned throughout a retail store, one or more price check stations 16 (sometimes referred to as "price check kiosks"), a control server 22 connected to a database (DB) 24, and in some cases, one or more mobile devices 30 associated with the customers in the retail store.

The IP network 12 may comprise any private and/or public data network known in the art, such as the Internet, for example, but is capable of communicating packets of data utilizing the well-known Internet Protocol (IP). Such data includes the commands, signals, and data with which control server 22 controls and communicates with remote devices such as cameras 14, price check station 16, and in some embodiments, mobile device 30, as well as the data representing the images captured by one or more cameras.

Cameras 14 may comprise any camera known in the art capable of capturing video imagery and/or still images, and then communicating those captured images to control server 22 via IP network 12. For example, in one embodiment, cameras 14 comprises a network of security cameras already existing at the retail store. Used conventionally, cameras 14 send the images they capture to control server 22. The images can then be output to one or more display devices in a centralized location. There, a human operator (e.g., a store employee or security officer) scans the images in real time to watch for undesirable activity, such as shoplifting, for example. In some cases, the images provided to the control server 22 can be stored in a long-term storage device, such as in DB 24, for example, and retrieved at some future time for review by the human operator.

In addition to these conventional functions, however, embodiments of the present disclosure extend the functionality of cameras 14 from typical security operations. In one embodiment, for example, cameras 14 are configured to capture one or more images of the people entering the retail store. In other embodiments, cameras 14 are configured to track the movements of the groups of socially interrelated people as hose groups move through the store. Moreover, cameras 14 are configured to capture one or more images of a person who has been separated from their group of socially interrelated people. Regardless of where the images are captured, however, cameras 14 are configured to send the images they capture to control server 22 for further processing and analysis, as described in more detail later.

The price check stations 16 are distributed throughout the retail store and comprise a user interface 18. Typically, the user interface 18 comprises a display device 18a and a scanner 18b. However, when configured according to the present disclosure, the price check station 16 also comprise an integrated camera 20. Such integrated cameras are beneficial, for example, in situations where a retail store does not have a network of security cameras 14, or in situations where an existing network of security cameras 14 does not have a clear view of the area in and around a price check station 16.

Regardless, price check stations 16 are conventionally configured to scan a barcode of an item presented by a customer using scanner 18b. Once scanned, the price check stations 16 obtain information about the item and output the information to display 18a so that the customer can decide on whether to purchase the item. Such information includes, for example, the names and prices of the items, expiry dates, promotional information (e.g., coupons), and ingredient and nutritional data.

In addition, however, the present disclosure extends the conventional functionality of the price check stations 16 to include functions that permit control server 22 to reunite the members of a group of socially interrelated people that have become separated from each other. Particularly, the present embodiments configure a camera 20 on price check station 16 to capture an image of a person that has become separated from his/her group of family and/or friends. The images are sent to control server 22 where they are analyzed and used to identify the group of family and/or friends the person belongs to. Once the person's group has been identified and located within the retail store, control server 22 sends a map to price check station 16 to be output to display 18a. The map, as seen later in more detail, indicates the location of the person (which coincides with the fixed location of the price check station 16 that captured the person's image), the location of the group from which the person is separated, and a path or route that leads the person to the group's location so that the person can be reunited with the group. Alternatively, or in addition, the map can also be sent to one or more of the mobile devices 30 within the group so that they can be reunited with the person.

Control server 22, which may comprise any computer device known in the art, can be configured to perform conventional functions and processes for the retail store. Such functions may include, for example, those implemented in connection with security, customer checkout, and other administrative tasks. However, according to the present disclosure, control server 22 is also configured to identify groups of socially interrelated people, track those groups as they move through the store, and should a member become separated from his/her group, reunite them with their group.

In more detail, control server 22 is configured according to the present aspects to obtain one or more images of the people in the retail store, digitally analyze those images, and classify people that are determined to be socially interrelated into corresponding groups of two or more members each. Thereafter, control server 22 uses the images captured by cameras 14 to monitor and track the groups as they move through the store. When one or more of the people become separated from their group, control server 22 is configured to locate their group in the store and reunite them with their group. As stated previously, control server 22 performs this function responsive to receiving an image of a person who has become separated from the group, and in some embodiments, generates and provides a map to the person who became separated and/or the other group members to help reunite the group.

Figure 2:
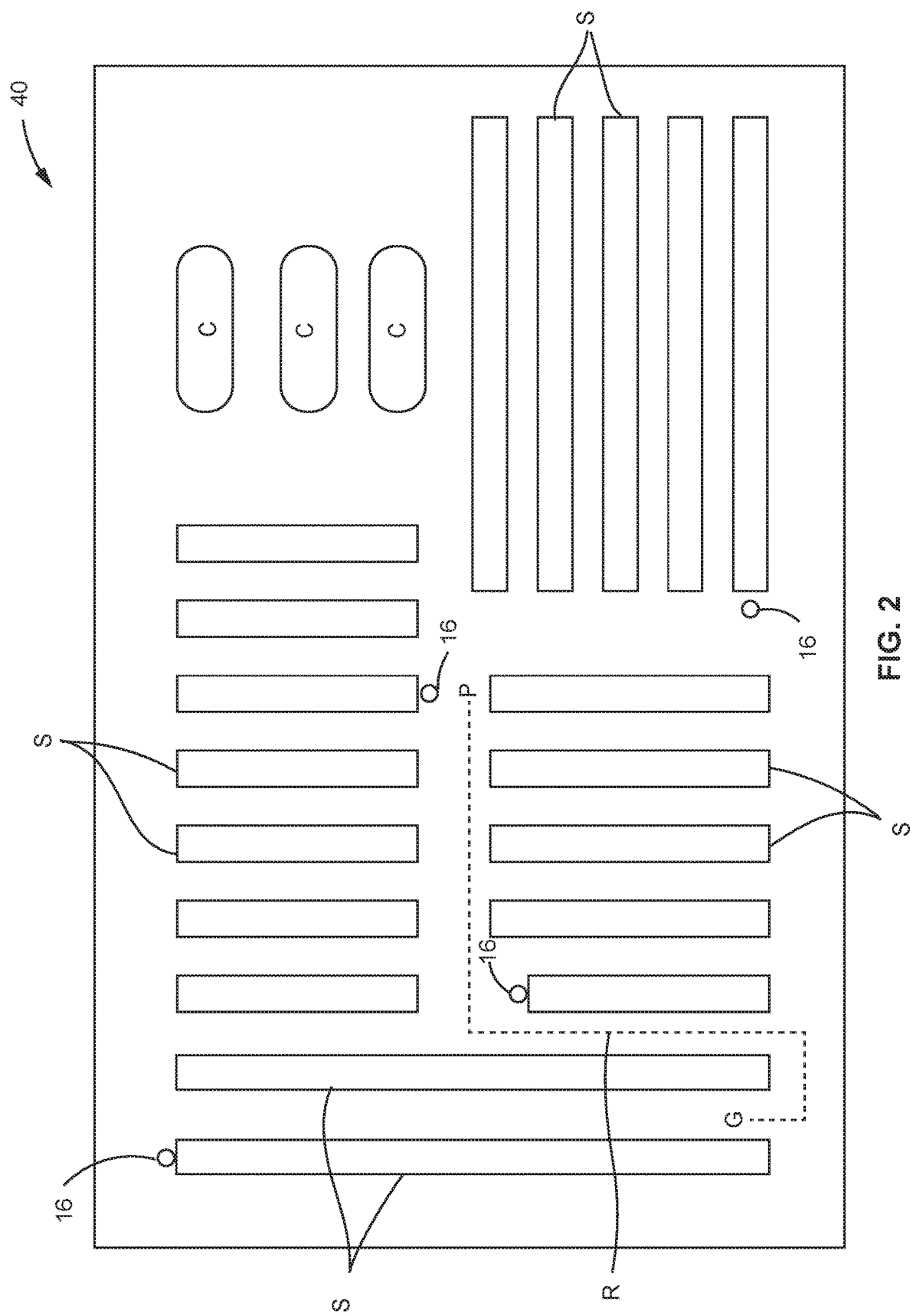
FIG. 2 illustrates a map of a retail store space that can be displayed on a display device according to the present disclosure.

FIG. 2 illustrates an exemplary map 40 generated by control server 22 according to one embodiment. As seen in FIG. 2, map 40 illustrates the layout of a retail store space and may be generated to graphically indicate as much or as little detail of the retail store space as needed or desired. In this embodiment, however, map 40 is generated with enough detail to provide someone viewing the map 40 with a general idea of the retail store layout. To accomplish this, map 40 is generated to indicate the locations and orientations of the various shelving S, checkout stations C (operator-assisted and/or self-checkout (SCO)), and price check stations 16

In addition, map 40 can be generated to indicate a pathway or route R that a person who has become separated from the group can follow to be reunited with the group. In one embodiment, the map 40 is provided to the price check station 16. When a person views the map at price check station 16, he/she will be able to go to the area of the store where the group is currently located. In another embodiment, map 40 is provided to the mobile device(s) 30 of one or more of the group members so that they can go to the current location of the person that became separated. In some embodiments, map 40 is provided to both the person at the price check station 16 and the other group members so that one or both will know the current location of the other, as well as a route to take to be reunited. Note, though, that with these latter embodiments, the mobile device(s) 30 would already be known to the control server 22 a priori. Further, the communications links that enable communications between the mobile device(s) 30 and the control server 22 (e.g., via BLUETOOTH) would either already established or will be established responsive to identifying the group. Regardless, map 40 is generated and provided for display to one or more members of the group to facilitate reuniting the group members.

Figure 3A:
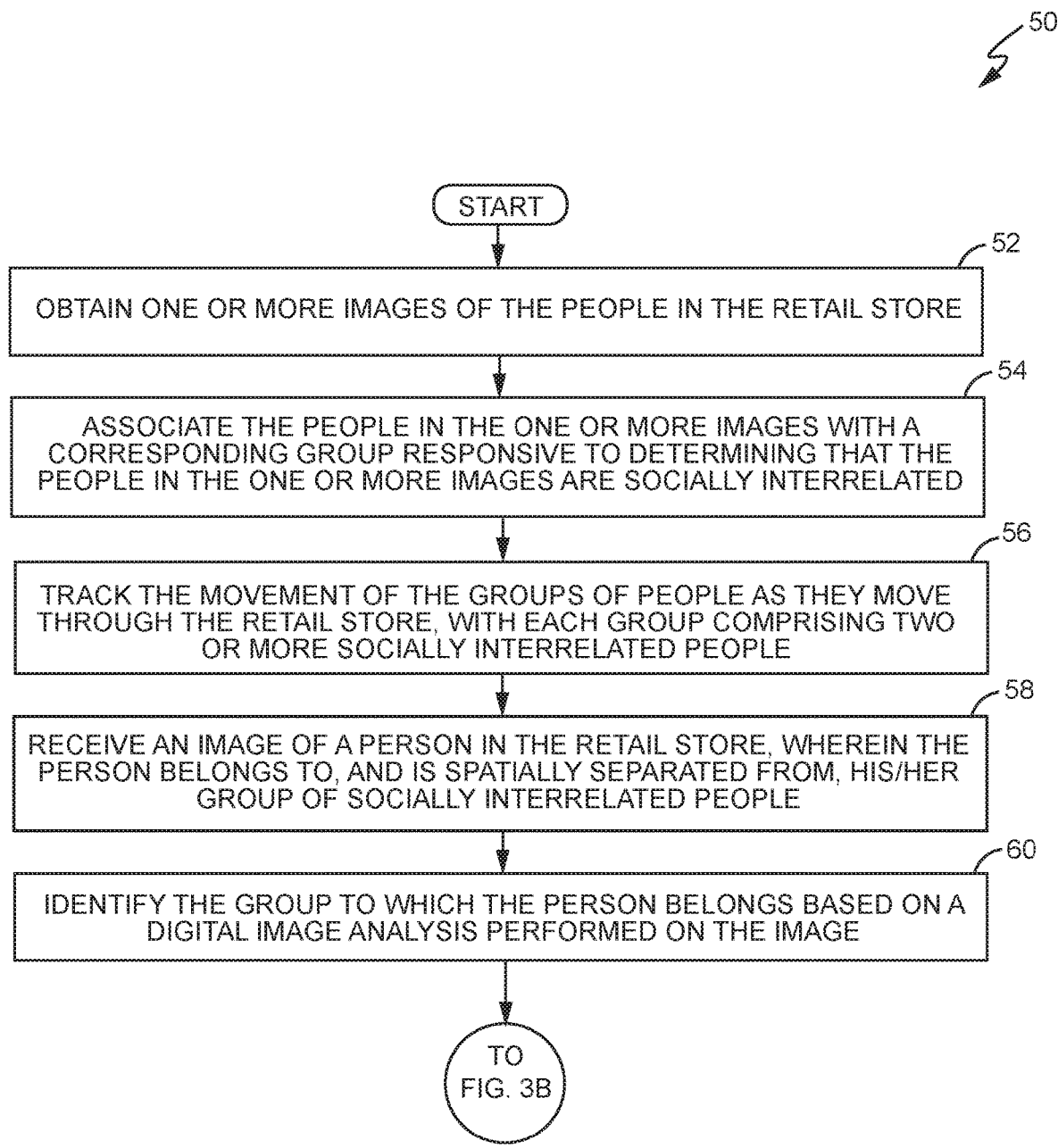
FIGS. 3A-3B are flow charts illustrating a method for reuniting the members of a group of socially interrelated people according to the present disclosure.
Figure 3B:
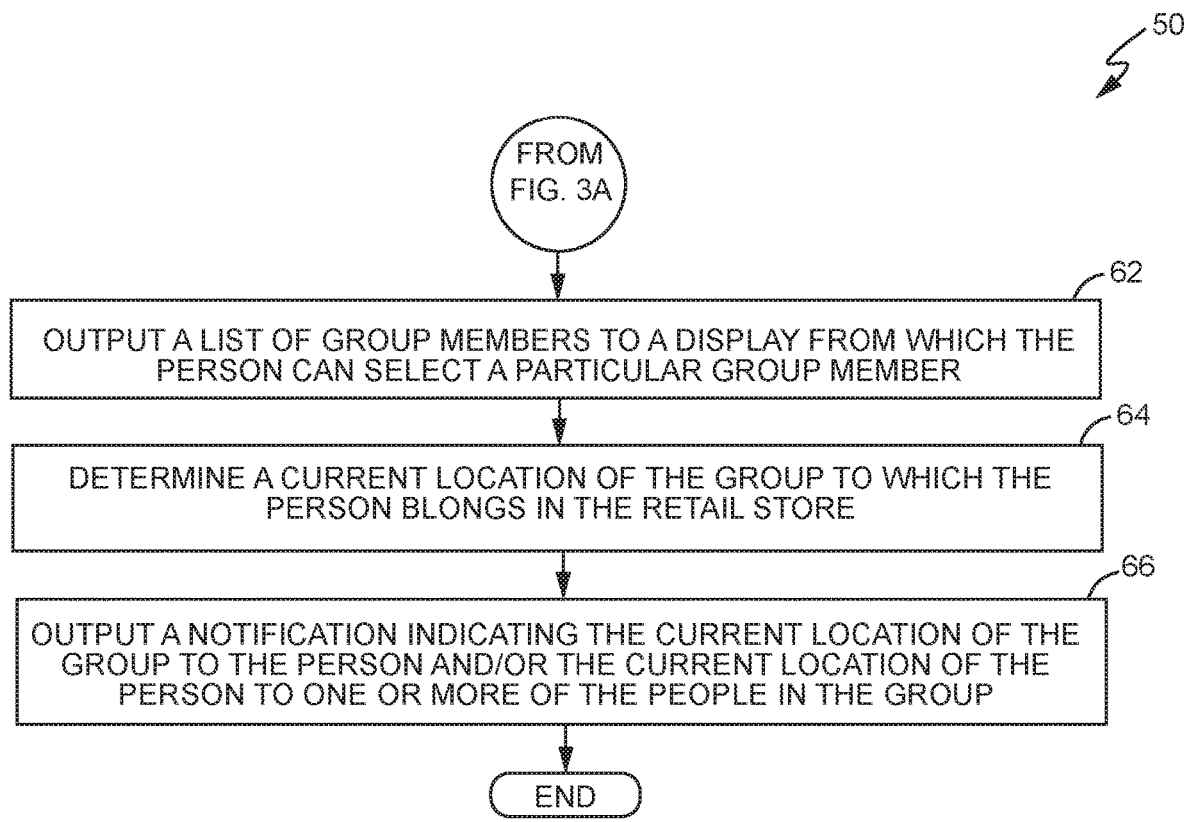

FIGS. 3A-3B are flow charts illustrating a method 50, implemented at control server 22, for reuniting the members of a group of socially interrelated people according to one embodiment. As seen in FIG. 3A, method 50 "begins" with control server 22 obtaining one or more images of the people in the retail store (box 52). For example, in one embodiment, control server 22 receives images of the people entering the store captured by one or more of the security cameras 14. In another embodiment, control server 22 receives the images as part of a provisioning process. As an example, customers may have their picture taken when they register for a "loyalty" program. These images could be stored in DB 24, along with the customer's information, as part of the customer's profile. As described in more detail later, these images can help control server 22 to identify customers when they enter the store and identify whether two or more people are socially interrelated.

Regardless of how control server 22 obtains the images, however, control server 22 determines whether the people in the images are socially interrelated, and associates such socially interrelated people in the images with a corresponding group (box 54).

There are various known methods for determining whether the people in an image are socially interrelated. In one embodiment, for example, the movements of the people entering the store are monitored and recorded over time (e.g., as they move throughout the store). The recorded images are analyzed at the frame level to determine their trajectories. People that are determined to have the same or similar trajectories can be considered to be socially interrelated, and thus, grouped or associated with one another as a socially interrelated group.

Other known techniques may also be used to determine whether people are socially interrelated, and/or to augment such determinations made based on trajectory determination. For example, in some embodiments, the images are analyzed using known techniques to determine whether the people in the group are, over time, interacting with each other (e.g., by speaking to each other), are touching each other (e.g., holding hands), or remain in close proximity to each other. In other embodiments, the images of the people entering the store are analyzed to digitally extract portions showing individual people. These extracted portions can then be compared against a library of known customer images (e.g., the images stored in connection with the customer profiles). Based on the results of the comparison, and/or on information associated with the customer images, the control server 22 can determine whether any of the people entering the store are family members and/or friends. Regardless of how groups of socially interrelated people are identified, however, control server 22 tracks the movement of the groups as they move through the store (box 56). Such tracking may, for example, be performed using security cameras 14 and known techniques.

As previously stated, a person may become separated from their group from time-to-time. By way of example only, such situations typically occur when a child wanders off from his/her family unit unnoticed by the parents, or when one person separates from the group to go to another part of the store. In such cases, it may be difficult for the group members to find each other again especially if the store is large. In these cases, system 10 is configured to reunite the group members.

In this embodiment, control server 22 receives an image of the person in the retail store who has become separated from his/her group (box 58). For example, each price check station 16 in the retail store can be configured to display a menu or other graphical user interface (GUI) that allows a person separated from their group to initiate a function such as "LOCATE MY GROUP." Responsive to receiving the user input, camera 20 would capture an image of the person's face. In situations where the price check stations 16 do not have integrated cameras 20, one or more of the security cameras 14 trained on the area of the price check station 16 can be controlled to capture the image of the person's face.

Regardless of whether camera 14 or camera 20 (or both) captures the image of the person's face, control server 22 is configured to perform a digital analysis on the received image and, based on that analysis, identify the particular group to which the person belongs (box 60). For example, control server 22 may use known methods to search for the image of the person's face in DB 24. If the image is located, control server 22 could determine, based on the data associated with the located image, the particular group to which the user belongs.

As previously stated, the data linking the image of the person's face to his/her particular group of socially interrelated people may have been provided by the person or other group members during a provisioning process. As an example, a mother or father may provide pictures of themselves, and their children, to control server 22 during a provisioning process and identify each person as being in their family group. Alternatively, or in addition, control server 22 can be configured to receive an image of the people entering the store followed by a plurality of subsequent images of those people as they walk through the store. Over time, control server 22 could be configured to analyze the images of the people in the group and determine, based on a mean separation between the members and/or other factors, whether two or more people in the images belong to a particular group. As seen in FIG. 3B, control server 22 may then output a list of the people in the person's group to display 18a so that the person may select (box 62).

For example, the person may, in some embodiments, be presented with a menu or other GUI that allows the person to specify a particular person in their group to locate (e.g., "FIND MOM," "FIND DAD,", FIND STEVE," etc.) (box 62). Upon receiving the selection, control server 22 determines the current location for the group (box 64). For example, in one embodiment, control server 22 might search DB 24 to determine if it already has current location information for the group as a result of tracking the group through the store. If the current location is not in DB 24, or if that information is considered stale, control server 22 could be configured to generate one or more commands to control cameras 14 to capture images of the people in the store. Using known techniques, control server 22 would then analyze the images captured by the security cameras and identify which of the images contains pictures of the other group members. Based on aspects such as the location of the camera(s) 14, 20 that captured the image, and/or the location of the price check station 16, the current location of the group could then be determined (box 64). However, regardless of how the current location information is determined, control server 22 outputs a notification to the person indicating the current location of the group (box 66). As previously stated, the notification comprises, in at least one embodiment, a map of the retail store indicating the locations of both the group and the separated members of the group and a route that they can take to be reunited with their group.

Figure 4:
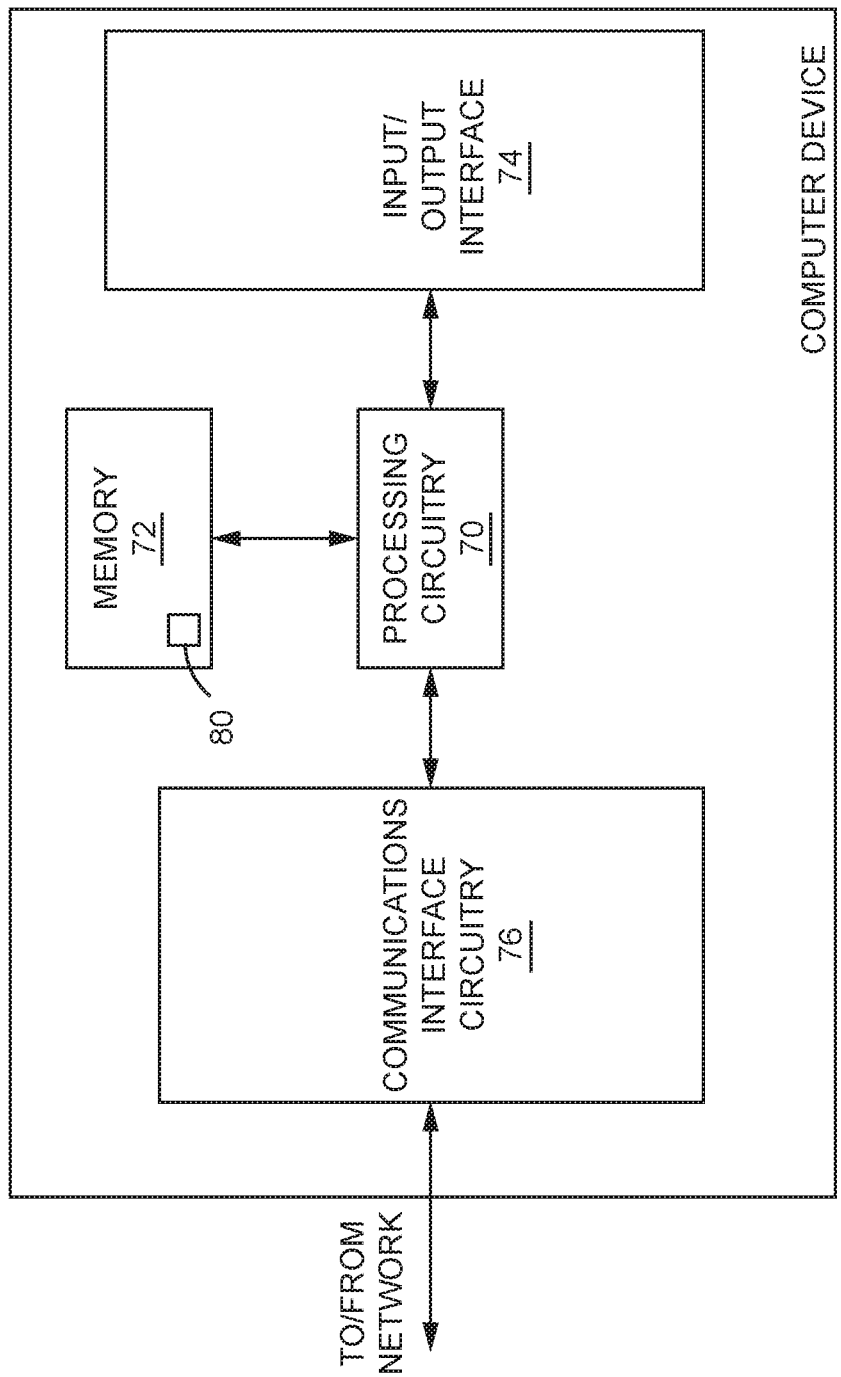
FIG. 4 is a block diagram illustrating some components of a computer device configured to function according to the present disclosure.

FIG. 4 is a block diagram illustrating some components of a computer device, such as control server 22, configured to operate according to one embodiment of the present disclosure. As seen in FIG. 4, control server 22 comprises processing circuitry 70, a memory 72 configured to store a control application 80, user input/output (I/O) devices 74, and communications interface circuitry 76.

Processing circuitry 70, which in some embodiments may comprise a plurality of separate processor circuits, may comprise any sequential state machine operative to execute machine instructions stored as machine-readable computer programs in the memory 72, such as one or more hardware-implemented state machines (e.g., in discrete logic, FPGA, ASIC, etc.); programmable logic together with appropriate firmware; one or more stored-program, general-purpose processors, such as a microprocessor or Digital Signal Processor (DSP), together with appropriate software; or any combination of the above. Processing circuitry 70 is generally configured to control the operations and functions of control server 22 according to the data and instructions stored in memory 72. This includes being controlled to perform the previously described functions in accordance with the code and logic comprising control application 80.

In particular, according to the present embodiments, processing circuitry 70 is controlled to, inter alia, track the movement of groups of two or more socially interrelated people through a retail store, receive an image of a person who belongs to, and is spatially separated from, a group of socially interrelated people in the retail store, identify the group to which the person belongs based on a digital image analysis performed on the image, determine a current location of the group in the retail store, and output a notification indicating the current location of the group to the person and/or a current location of the person to one or more of the people in the group.

The memory 72 is operatively connected to processing circuitry 70 and may comprise any non-transitory machine-readable media known in the art. Such media includes, but is not limited to, SRAM, DRAM, DDRAM, ROM, PROM, EPROM, Flash memory, and the like. In one embodiment, memory 72 comprises memory that is positioned on the inside of the control server 22. In other embodiments, however, it is not. Thus, in at least some embodiments, memory 72 comprises an external database, such as DB 24, communicatively connected to the control server 22.

The User I/O interface 74 comprise those devices that allow a customer or other user to interact with, and control the operation of, control server 22 in accordance with the present embodiments. Such devices include, but are not limited to, display devices, including those with a touchscreen), keyboards, keypads, a mouse, and the like.

The communications interface circuitry 76 may comprise, for example, an ETHERNET interface or a wireless interface, such as a WiFi interface operating according to any of the 802.XX protocols. Communications interface circuitry 76 allows control server 22 to communicate data and messages with other remote devices, such as cameras 14, price check stations 16, DB 24, and mobile devices 30, via IP network 12 using any of a variety of well-known and well-documented protocols, such as UDP and/or TCP/IP, for example. Other communication interfaces not specifically mentioned herein are also possible FIG. 5 is a functional block diagram illustrating a computer program product configured to control a computer to reunite the members of a group of socially interrelated people according to one embodiment according to one embodiment of the present disclosure. As seen in FIG. 5, the computer program product is executed by processing circuitry 70 and comprises an image obtaining module/unit 82, an image analysis module/unit 84, a group associating module/unit 86, a group tracking module/unit 88, a group identification module/unit 90, a location determination module/unit 92, a notification generation module/unit 94, and a communications interface module/unit 96.

In one embodiment, the image obtaining module/unit 82 is configured to control processing circuitry 70 to obtain digital images from an image source. In some embodiments, the image source comprises the array if security cameras 14 disposed throughout the store, while in other embodiments, the image source comprises camera 20 integrated into the price check stations 16, as previously described.

The image analysis module/unit 84 is configured to perform an image analysis on the digital images obtained by the image obtaining module/unit 82. In one embodiment, the image analysis unit/module 84 configures processing circuitry 70 to perform the image analysis. In other embodiments, however, the image analysis unit/module 82 configures processing circuitry 70 to generate the signals and messages necessary for sending the digital images to another computer where the image analysis is performed. In these latter cases, the image analysis unit/module 84 also configures processing circuitry 70 to receive the results of the image analysis.

The group associating module/unit 86 determines whether two or more people in the retail store are socially interrelated, and if so, associates those people into a group. As stated above, the group may comprise family members, friends, acquaintances, or any combination thereof.

The group tracking module/unit 88 is configured to control processing circuitry 70 to track the movement of the various groups of socially interrelated people throughout the retail store, and the group identification module/unit 90 is configured to control processing circuitry 70 to identify the group to which a person that is separated from the group belongs. The location determination module/unit 92 is configured to determine the location in the store of one or more members of the group, the person who has become separated from the group, or both. The notification generation module/unit 94 is configured to control processing circuitry 70 to generate a notification to the person and/or other members of the group (e.g., the map previously discussed), and the communications interface module/unit 96 is configured to send the notifications to the price check station 16 and/or the mobile device(s) of one or more group members so that the members of the group can be reunited.

The present embodiments may, of course, be carried out in other ways than those specifically set forth herein without departing from essential characteristics of the invention. For example, in the previous embodiments, a person that is separated from the group can walk up to a price check station 16 and initiate the reunification functions. However, the present embodiments are not so limited. In some cases, the person that is separated from the group is a small child unable to operate the price check station 16. Therefore, according to the present embodiments, a group member (e.g., a mother or father) can initiate the reunification functions described herein. In these cases, the group member can identify the person he/she is looking for to the control server 22. Upon receipt, control server 22 would control cameras 14 to captures images of the people in the store, locate the person of interest based on an analysis of those images, and provide a map to the requesting group member indicating the locations of the group members and a route through the store to reunite the group members as previously described. Therefore, the present embodiments are to be considered in all respects as illustrative and not restrictive, and all changes coming within the meaning and equivalency range of the appended claims are intended to be embraced therein.

What is claimed is:

1. A method for reuniting members of a group of socially interrelated people, the method comprising:
 tracking movement of one or more groups of people in a retail store, wherein each group comprises two or more socially interrelated people;
 receiving an image of a person in the retail store, wherein the person belongs to, and is spatially separated from, a group of socially interrelated people in the retail store;
 identifying the group to which the person belongs based on a digital image analysis performed on the image;
 determining a current location of the group in the retail store; and
 outputting a notification indicating at least one of:
  the current location of the group to the person; and
  a current location of the person to one or more of the people in the group.

2. The method of claim 1 wherein receiving an image of a person in the retail store comprises receiving the image from a camera disposed at a predetermined location in the retail store.

3. The method of claim 2 wherein receiving the image from the camera comprises receiving the image from a camera-equipped price check station in the retail store.

4. The method of claim 3 further comprising outputting a list of members in the group to a display of the price check station, and wherein determining a current location of the group comprises determining the current location of a member of the group selected from the list by the person.

5. The method of claim 1 further comprising obtaining one or more images of the people in the retail store, wherein obtaining the one or more images comprises one of:
 capturing the one or more images as the people enter the retail store; and
 receiving the one or more images as part of a provisioning process.

6. The method of claim 5 further comprising associating the people in the one or more images with the group responsive to determining that the people in the one or more images are socially interrelated.

7. The method of claim 5 wherein identifying the group to which the person belongs comprises determining whether the person is in the one or more images.

8. The method of claim 1 wherein outputting the notification to the person comprises:
   outputting a map of the retail store to the person on a display;
   indicating the current location of the group to which the person belongs on the map; and
   indicating a path through the retail store to the current location of the group.

9. The method of claim 1 wherein outputting a notification indicating a current location of the person to one or more of the people in the group comprises:
   generating a notification indicating:
      the current location of the person on a map of the retail store; and
      a path through the retail store to the current location of the person; and
   sending the notification to a mobile device of one or more group members.

10. The method of claim 1 further comprising determining that the two or more people are socially interrelated based on a monitored distance between the two people over time.

11. A computer for reuniting members of a group of socially interrelated people in a retail store, the computer comprising:
   a communication interface circuit configured to communicate with one or more nodes via a communications network; and
   processing circuitry operatively coupled to the communication interface circuit and configured to:
      track movement of one or more groups of people in a retail store, wherein each group comprises two or more socially interrelated people;
      receive an image of a person in the retail store, wherein the person belongs to, and is spatially separated from, a group of socially interrelated people in the retail store;
      identify the group to which the person belongs based on a digital image analysis performed on the image;
      determine a current location of the group in the retail store; and
      output a notification indicating at least one of:
         the current location of the group to the person; and
         a current location of the person to one or more of the people in the group.

12. The computer of claim 11 wherein the processing circuitry is configured to receive the image from a camera disposed at a predetermined location in the retail store.

13. The computer of claim 12 wherein the camera is associated with a price check station at the predetermined location.

14. The computer of claim 13 wherein the processing circuitry is further configured to:
   output a list of members in the group to a display of the price check station; and
   determine the current location of the group by determining a current location of at least one member of the group selected from the list by the person.

15. The computer of claim 11 wherein the processing circuitry is further configured to obtain one or more images of the people in the retail store by performing one of:
   capturing the one or more images as the people enter the retail store; and
   receiving the one or more images as part of a provisioning process.

16. The computer of claim 14 wherein the processing circuitry is further configured to the people in the one or more images with the group responsive to determining that the people in the one or more images are socially interrelated.

17. The computer of claim 14 wherein to identify the group to which the person belongs, the processing circuitry is configured to determine whether the person is in the one or more images.

18. The computer of claim 11 wherein to output the notification to the person, the processing circuitry is configured to:
   output a map of the retail store to the person on a display;
   indicate the current location of the group to which the person belongs on the map; and
   indicate a path through the retail store to the current location of the group.

19. The computer of claim 11 wherein to output a notification indicating a current location of the person to one or more of the people in the group, the processing circuitry is configured to:
   generate a notification indicating:
      the current location of the person on a map of the retail store; and
      a path through the retail store to the current location of the person; and
   send the notification to a mobile device of the member of one or more group members.

20. A non-transitory computer-readable storage medium comprising computer program code stored thereon that, when executed by a processing circuit of a computer associated with a retail store, configures the processing circuit to:
   track movement of one or more groups of people in a retail store, wherein each group comprises two or more socially interrelated people;
   receive an image of a person in the retail store, wherein the person belongs to, and is spatially separated from, a group of socially interrelated people in the retail store;
   identify the group to which the person belongs based on a digital image analysis performed on the image;
   determine a current location of the group in the retail store; and
   output a notification indicating at least one of:
      the current location of the group to the person; and
      a current location of the person to one or more of the people in the group.

* * * * *